US010291795B2

(12) United States Patent
Sakai

(10) Patent No.: US 10,291,795 B2
(45) Date of Patent: May 14, 2019

(54) COMMUNICATION APPARATUS, METHOD FOR CONTROLLING COMMUNICATION APPARATUS, AND STORAGE MEDIUM FOR SELECTING AN APPARATUS IN A WIRELESS NETWORK

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 15/943,514

(22) Filed: Apr. 2, 2018

(65) Prior Publication Data

US 2018/0227443 A1    Aug. 9, 2018

Related U.S. Application Data

(63) Continuation of application No. 14/162,544, filed on Jan. 23, 2014, now Pat. No. 9,961,215.

(30) Foreign Application Priority Data

Jan. 25, 2013    (JP) ................................ 2013-012131

(51) Int. Cl.
*G06F 3/12* (2006.01)
*H04N 1/00* (2006.01)
*H04W 8/00* (2009.01)

(52) U.S. Cl.
CPC ....... *H04N 1/00278* (2013.01); *G06F 3/1204* (2013.01); *G06F 3/1236* (2013.01); *G06F 3/1292* (2013.01); *H04N 1/00408* (2013.01); *H04W 8/005* (2013.01); *H04N 2201/0039* (2013.01); *H04N 2201/0055* (2013.01); *H04N 2201/0084* (2013.01)

(58) Field of Classification Search
CPC ............................ G06F 3/1236; G06F 3/1292
See application file for complete search history.

(56) References Cited

U.S. PATENT DOCUMENTS

| 6,574,452 B1* | 6/2003 | Morvan ................. H04L 29/06 455/11.1 |
| 8,908,614 B2* | 12/2014 | Hirose ................. H04W 84/20 370/329 |
| 2005/0148326 A1* | 7/2005 | Nogawa .............. H04L 41/0806 455/420 |
| 2005/0174967 A1* | 8/2005 | Morvan ................ H04W 84/20 370/329 |
| 2005/0246431 A1* | 11/2005 | Spitaels .............. H04L 12/4625 709/222 |
| 2006/0136603 A1* | 6/2006 | Morvan ............... H04B 7/2687 709/248 |
| 2006/0165133 A1* | 7/2006 | Yokota .................... H04L 12/12 372/6 |
| 2006/0246946 A1* | 11/2006 | Moritomo ............. H04W 76/10 455/557 |

(Continued)

*Primary Examiner* — Nicholas Pachol
(74) *Attorney, Agent, or Firm* — Canon U.S.A., Inc. IP Division

(57) ABSTRACT

A communication apparatus is configured to accept input of a condition for selecting a communication apparatus to connect to, receive, from a first communication apparatus that is operating as a base station in a wireless network, information on the first communication apparatus and information on a second communication apparatus that is participating in the wireless network established by the first communication apparatus, and display, from among the first communication apparatus and the second communication apparatus, a communication apparatus or communication apparatuses that meet the condition input via the input unit, based on the received information.

10 Claims, 9 Drawing Sheets

(56) References Cited

U.S. PATENT DOCUMENTS

| | | | | |
|---|---|---|---|---|
| 2007/0140197 | A1* | 6/2007 | Sawada | H04W 76/14 370/338 |
| 2007/0207765 | A1* | 9/2007 | Nakahara | H04W 52/0216 455/343.1 |
| 2009/0037591 | A1* | 2/2009 | Sakai | H04L 63/20 709/228 |
| 2010/0220605 | A1* | 9/2010 | Fujii | H04L 67/14 370/252 |
| 2010/0296455 | A1* | 11/2010 | Nakajima | H04W 84/20 370/328 |
| 2010/0323758 | A1* | 12/2010 | Amano | H04N 1/00342 455/557 |
| 2011/0026068 | A1* | 2/2011 | Yoshida | H04N 1/00347 358/1.14 |
| 2011/0063990 | A1* | 3/2011 | Nogawa | H04W 76/19 370/252 |
| 2011/0170468 | A1* | 7/2011 | Jain | H04W 48/12 370/312 |
| 2011/0170484 | A1* | 7/2011 | Nagai | H04W 88/02 370/328 |
| 2011/0188421 | A1* | 8/2011 | Nakahara | H04W 52/02 370/311 |
| 2011/0205971 | A1* | 8/2011 | Ito | H04W 88/06 370/328 |
| 2013/0039358 | A1* | 2/2013 | Ejima | H04W 84/20 370/338 |
| 2013/0065627 | A1* | 3/2013 | Jung | H04W 76/15 455/515 |
| 2013/0198412 | A1* | 8/2013 | Saito | H04L 29/12009 709/245 |
| 2015/0230280 | A1* | 8/2015 | Dees | H04W 76/023 455/39 |

* cited by examiner

COMMUNICATION APPARATUS, METHOD FOR CONTROLLING COMMUNICATION APPARATUS, AND STORAGE MEDIUM FOR SELECTING AN APPARATUS IN A WIRELESS NETWORK

This application is a Continuation of U.S. application Ser. No. 14/162,544, filed Jan. 23, 2014, which claims priority from Japanese Patent Application No. 2013-012131, filed Jan. 25, 2013. These applications are hereby incorporated by reference herein in their entireties.

BACKGROUND OF THE INVENTION

Field of the Invention

The present invention relates to a communication apparatus, a method for controlling a communication apparatus, and a storage medium.

Description of the Related Art

In recent years, a case has been increasing in which an electronic apparatus such as a digital camera is provided with a wireless local area network (LAN) client function and such an electronic apparatus is connected to a wireless LAN to be used as a communication apparatus. For example, Japanese Patent Application Laid-Open No. 2011-35768 discusses a technique for facilitating image sharing by providing a digital camera with a wireless LAN function.

In addition, a communication method is being discussed in which a communication apparatus such as a portable telephone and a digital camera that is provided with a wireless LAN function serves as a base station (access point) in a wireless LAN and carries out inter-apparatus communication with another communication through an infrastructure mode (Japanese Patent Application Laid-Open No. 2009-225060).

Wi-Fi Alliance has defined a standard called Wi-Fi Direct. Carrying out connection processing as defined in Wi-Fi Direct enables a direct connection between communication apparatuses through the infrastructure mode without a complicated user operation, which in turn improves user convenience.

In the case where communication apparatuses directly communicate with each other through Wi-Fi Direct, a user selects a communication apparatus to communicate with through a user interface (UI) of a user's communication apparatus.

In this case, the user's communication apparatus searches for Wi-Fi Direct supported apparatuses that are present nearby and displays, in its UI, a list of Wi-Fi Direct supported apparatuses found through the search. After the list is displayed, the user selects a desired apparatus from the displayed list. The user's communication apparatus then carries out processing to connect to the selected apparatus as defined in Wi-Fi Direct to thus achieve direct communication.

To date, in the aforementioned UI display processing, among the Wi-Fi Direct supported apparatuses found through the search, apparatuses aside from those operating as wireless LAN clients, or in other words, only the apparatuses operating as base stations are displayed in the UI. Alternatively, apparatuses operating as wireless LAN clients are grayed out so that the user cannot select them. This is because wireless LAN clients cannot directly communicate with each other in the infrastructure mode.

In addition, information on the communication apparatuses displayed in the aforementioned UI display processing includes device names set as desired by the respective communication apparatuses, media access control (MAC) addresses of the communication apparatuses, or the like.

In this manner, with the existing technique, it is difficult for the user to select a desired apparatus from the search result if the desired communication apparatus is already operating as a wireless LAN client or if the displayed information does not allow the user to specify the desired apparatus with ease.

SUMMARY OF THE INVENTION

The present invention is directed to improving user convenience when the user selects a desired communication apparatus.

According to an aspect of the present invention, a communication apparatus includes an input unit configured to accept input of a condition for selecting a communication apparatus to connect to, a receiving unit configured to receive, from a first communication apparatus that is operating as a base station in a wireless network, information on the first communication apparatus and information on a second communication apparatus that is participating in the wireless network established by the first communication apparatus, and a display unit configured to display, from among the first communication apparatus and the second communication apparatus, a communication apparatus or communication apparatuses that meet the condition input via the input unit, based on the information received by the receiving unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Although an example in which a wireless LAN system that is compliant to the IEEE 802.11 series will be described hereinafter, a communication mode is not limited to the IEEE 802.11 compliant wireless LAN.

Figure 1:
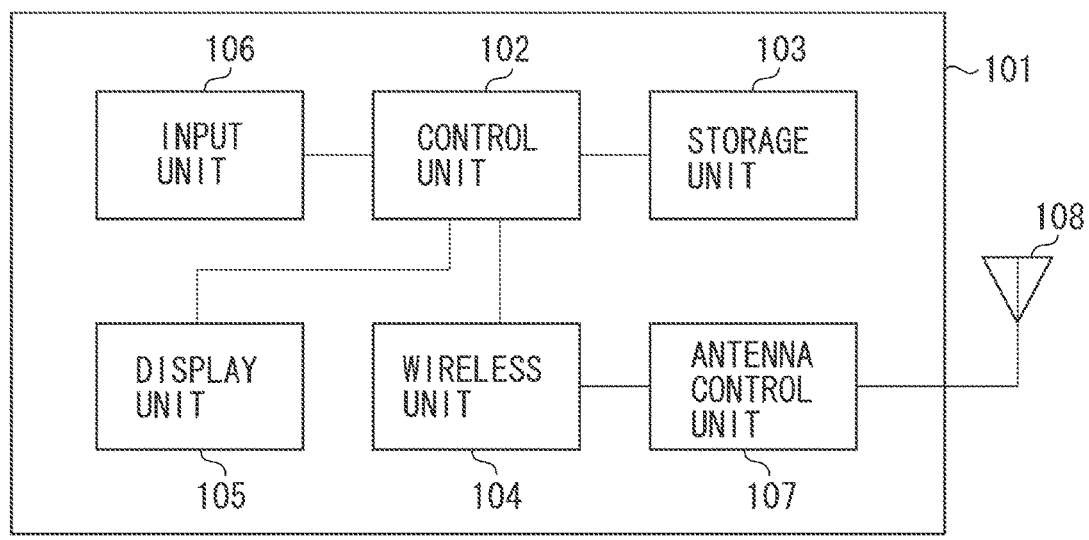
FIG. 1 is a hardware block diagram of a communication apparatus according to an exemplary embodiment.

FIG. 1 is a block diagram illustrating an exemplary hardware configuration of a communication apparatus according to an exemplary embodiment.

A communication apparatus 101 includes a control unit 102 and a storage unit 103, and the control unit 102 executes a control program stored in the storage unit 103 to thus control the communication apparatus 101 as a whole. The control unit 102 includes one or a plurality of processors such as a central processing unit (CPU) and a microprocessor unit (MPU). The control unit 102 also controls a system for automatically configuring a communication parameter used in communication with another apparatus. The storage unit 103 stores various control programs to be executed by the control unit 102 and various pieces of information such as the communication parameter. The storage unit 103 may also store image data, files, and so on that are generated by the communication apparatus 101 or received from an external apparatus. Various operations of the communication apparatus 101 are implemented by the control 102 executing the control programs stored in the storage unit 103. The storage unit 103 includes a memory such as a read only memory (ROM) and a random access memory (RAM), or various storage media such as a flexible disk, a hard disk, an optical disk, a magneto-optical disk, a compact disc (CD)-ROM, a CD-R, a magnetic tape, a non-volatile memory card, and a digital versatile disc (DVD).

A wireless unit 104 communicates through a wireless LAN that is compliant to the IEEE 802.11 series. A display unit 105 is capable of various types of display and has a function that enables output of visually recognizable information as with a liquid crystal display (LCD) and a light emitting diode (LED) or enables audio output as with a speaker. The display unit 105 is provided with a function of outputting at least one of visual information and audio information. An antenna control unit 107 controls an antenna 108 to transmit and receive signals through wireless communication. A user inputs various pieces of information via an input unit 106 to operate the communication apparatus 101. The input unit 106 includes various buttons, a touch panel, and so on. Note that the communication apparatus 101 may include other hardware configurations aside from the hardware configurations illustrated in FIG. 1. If the communication apparatus 101 is, for example, a digital camera, the communication apparatus 101 includes an image capturing unit, or if the communication apparatus 101 is a printer, the communication apparatus 101 includes a print unit.

Figure 2:
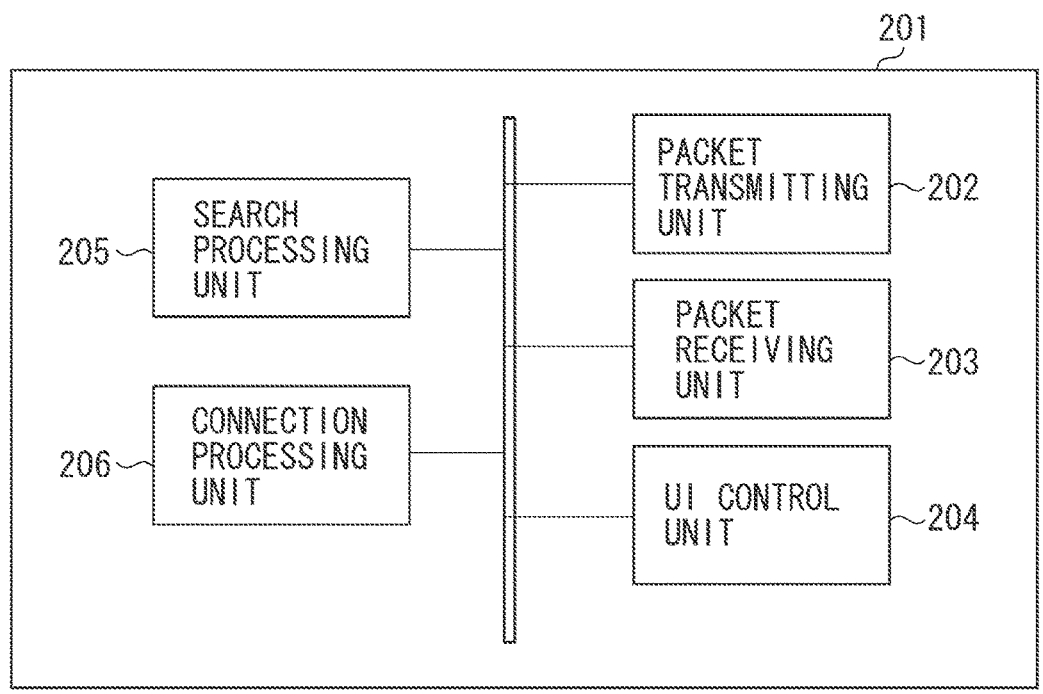
FIG. 2 is a software block diagram of the communication apparatus according to the exemplary embodiment.

FIG. 2 is a block diagram illustrating an exemplary software configuration of the communication apparatus 101 according to the exemplary embodiment.

A software functional block 201 includes a packet transmitting unit 202 that transmits a packet related to various types of communication. The packet transmitting unit 202 transmits each of the signals described later. A packet receiving unit 203 receives a packet related to various types of communication. The packet receiving unit 203 receives each of the signals described below. A UI control unit 204 controls the display unit 105 and the input unit 106. The UI control unit 204 carries out processing for displaying information to the user, processing on an input from the user, and so on. A search processing unit 205 searches for an apparatus of which the type matches a type desired by the user. The search processing unit 205 carries out apparatus search processing. A connection processing unit 206 controls wireless LAN connection processing. The connection processing unit 206 carries out connection processing. In the present exemplary embodiment, the connection processing unit 206 carries out connection processing as defined in Wi-Fi Direct.

Note that each of the functional blocks illustrated in FIG. 2 may be provided not only through software but also through hardware. The functional blocks illustrated in FIG. 2 are interrelated to one another. The functional blocks illustrated in FIG. 2 merely indicate an example, and a plurality of functional blocks may form a single functional block, or some of the functional blocks may be divided into blocks that implement a plurality of functions.

Figure 3:
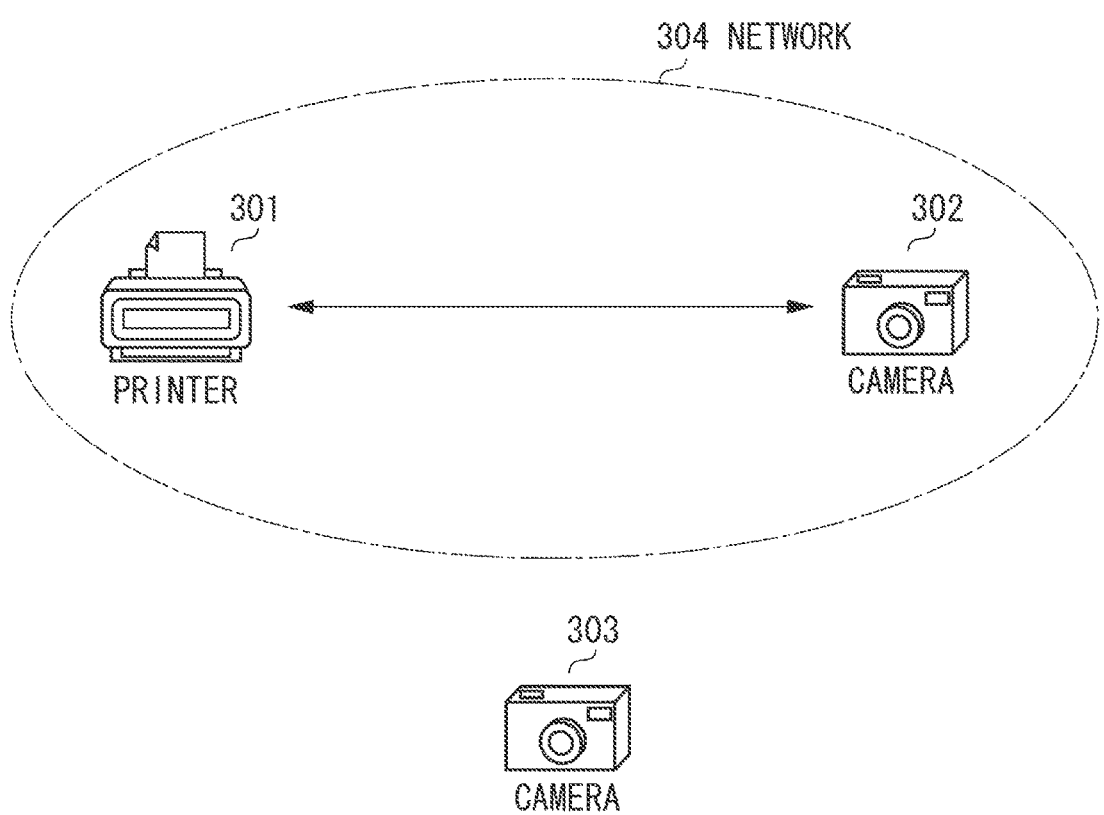
FIG. 3 illustrates a network configuration according to the exemplary embodiment.

FIG. 3 illustrates a network system configuration of the exemplary embodiment. In the exemplary embodiment, a camera and a printer are assumed as examples of the communication apparatus 101, and a use case in which an image stored in the camera is transmitted to the printer through wireless communication and the image is printed by the printer is assumed. In the example illustrated in FIG. 3, a printer 301 and a camera 302 each serving as the communication apparatus 101 establish a Wi-Fi Direct network 304.

In the exemplary embodiment, a processing operation in which a camera 303 serving as the communication apparatus 101 connects to the printer 301 to directly communicate with the printer 301 will be described. In the network 304, which is already established, one of the printer 301 and the camera 302 operates as a base station in the wireless LAN and the other operates as a client in the wireless LAN. The communication apparatus 101 that operates as the base station in the wireless LAN establishes the wireless LAN network. Meanwhile, the communication apparatus 101 that operates as the client in the wireless LAN participates in the wireless LAN network established by the communication apparatus 101 that operates as the base station to communicate with the communication apparatus 101 that operates as the base station.

Note that the printer 301, the camera 302, and the camera 303 illustrated in FIG. 3 each have the configurations illustrated in FIGS. 1 and 2. In addition, although FIG. 3 illustrates an example in which only the aforementioned three communication apparatuses are present, an additional communication apparatus may also be present.

Figure 4:
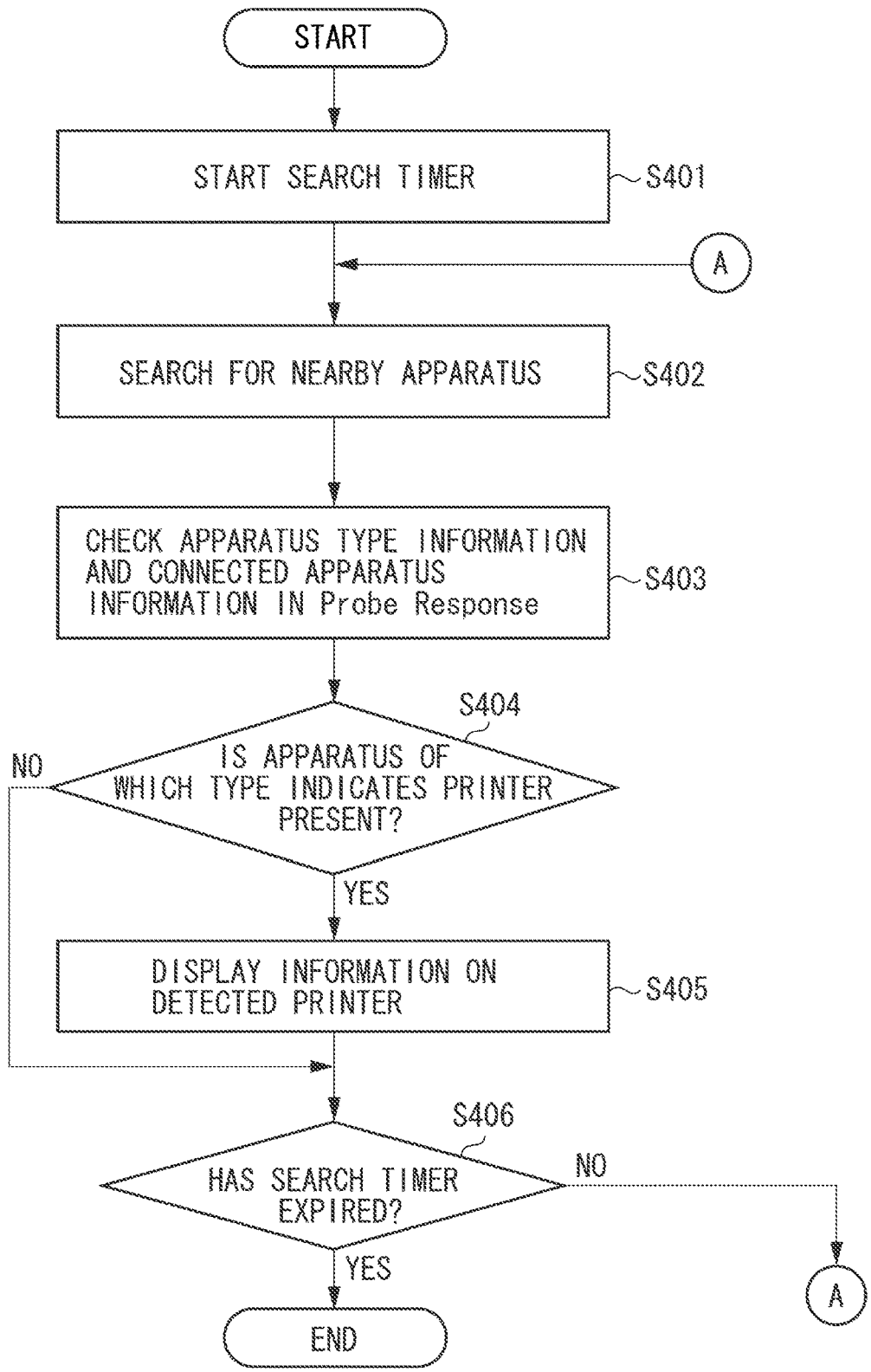
FIG. 4 is a flowchart illustrating a printer search processing operation according to the exemplary embodiment.

FIG. 4 is a flowchart illustrating processing carried out by the camera 303 for searching for an apparatus to connect to. Each of the steps in the flowchart illustrated in FIG. 4 is implemented by the control unit 102 executing a program stored in the storage unit 103 of the camera 303.

Prior to the start of the processing in the flowchart illustrated in FIG. 4, the user operates the camera 303 to input, via the input unit 106, a type of a communication apparatus to search for. The type of the communication apparatus may be a printer, a camera, a personal computer (PC), a smartphone, or the like, or may be an apparatus other than those listed above. The user operates the input unit 106 of the camera 303 to provide an instruction for starting a search for the selected type of communication apparatus. The instruction for starting the search may be indicated by pressing a dedicated button, activating a Wi-Fi Direct function, or the like, or the search may start automatically upon input of the type of the communication apparatus to search for.

Upon the start of the search processing, the processing in the flowchart illustrated in FIG. 4 starts. Although a case in which a printer has been selected as the type of the communication apparatus to search for is described with reference to the example illustrated in FIG. 4, the search processing can be carried out similarly, even when another type of communication apparatus is selected, simply by changing the search condition.

In step S401, the search processing unit 205 starts a search timer. In step S402, the packet transmitting unit 202 transmits a Probe Request, which serves as a search signal, and waits for a Probe Response to be returned from a nearby apparatus. In the Wi-Fi Direct system, an apparatus that transmits a Probe Response in response to receiving a Probe Request is an apparatus that is operating as a base station or an apparatus that is operating neither as a base station nor a client apparatus. An apparatus that is operating as a client apparatus does not transmit a Probe Response.

The Probe Response includes information indicating the type of a transmitter apparatus (i.e., apparatus type information) and information indicating a wireless LAN client apparatus that is participating in the wireless LAN network established by the transmitter apparatus (i.e., connected apparatus information). The connected apparatus information includes at least identification information for identifying a wireless LAN client apparatus that is connected wirelessly to the transmitter apparatus and information indicating the type of the wireless LAN client apparatus. Thus, a communication apparatus that has transmitted a Probe Request can obtain information not only on an apparatus that is operating as a base station but also on an apparatus that is operating as a client apparatus.

In step S403, the search processing unit 205 checks the apparatus type information and the connected apparatus information included in the Probe Response. In step S404, the search processing unit 205 determines whether an apparatus of which the type indicates a printer is present based on the result obtained by checking the apparatus type information and the connected apparatus information. Specifically, if the apparatus type information included in the Probe Response indicates a printer and the connected apparatus information is included in the Probe Response, the search processing unit 205 can determine that the printer is operating as the base station. In addition, the search processing unit 205 can detect another printer that is operating as a wireless LAN client based on the connected apparatus information included in the Probe Response.

If the search processing unit 205 has detected printers in step S404, then in step S405, the search processing unit 205 displays information on the detected printers in the display unit 105 through the UI control unit 204. The printers displayed here include not only a printer that is operating as the base station but also a printer that is operating as the wireless LAN client. Thus, the user can search for a desired type of communication apparatus from a greater variety of communication apparatuses.

Figure 8:
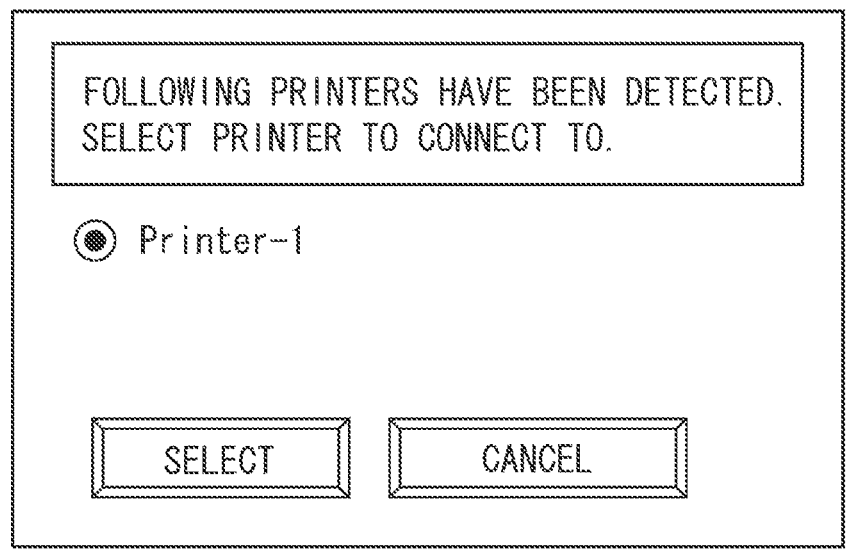
FIG. 8 illustrates an exemplary screen displayed on a camera according to the exemplary embodiment.

In step S405, the search processing unit 205 also stores, in the storage unit 103, information indicating whether the detected printer is operating as the base station or as the wireless LAN client. In the exemplary embodiment, the search processing unit 205 displays information indicating the device names of the printers which are included in the Probe Response. FIG. 8 illustrates an example of a search result screen displayed, as a result of the search, on the display unit 105 of the camera 303. If a plurality of printers has been detected through the search processing, information on all of the detected printers is displayed and the user is prompted to make a selection. Note that the information to be displayed is not limited to the device name of the printer, and any piece of information that identifies the communication apparatus found through the search may be displayed. In addition, information indicating whether each of the displayed communication apparatuses is operating as a base station or a wireless LAN client may be displayed along with the aforementioned information. Such display allows the user to select a communication apparatus to connect to while taking such information into consideration.

If a printer is not detected in step S404, then in step S406, the search processing unit 205 determines whether the search timer has expired. If the search timer has expired, the processing illustrated in FIG. 4 is terminated. Meanwhile, if the search timer has not expired in step S406, the processing returns to step S402 and the subsequent processing is repeated.

If the search processing unit 205 detects an apparatus of which the type indicates a printer in step S404, the search processing unit 205 may count the number of wireless LAN client apparatuses that are connected wirelessly to the transmitter apparatus by using information included in the Probe Response. If the count result indicates that the number of the wireless LAN client apparatuses has reached a maximum number of connected apparatuses, the search processing unit 205 may proceed to step S406 without displaying information on the detected printers (or disabling the detected printers in the display) in step S405. Such a configuration can prevent the user from selecting a printer that is not available for communication.

Figure 5:
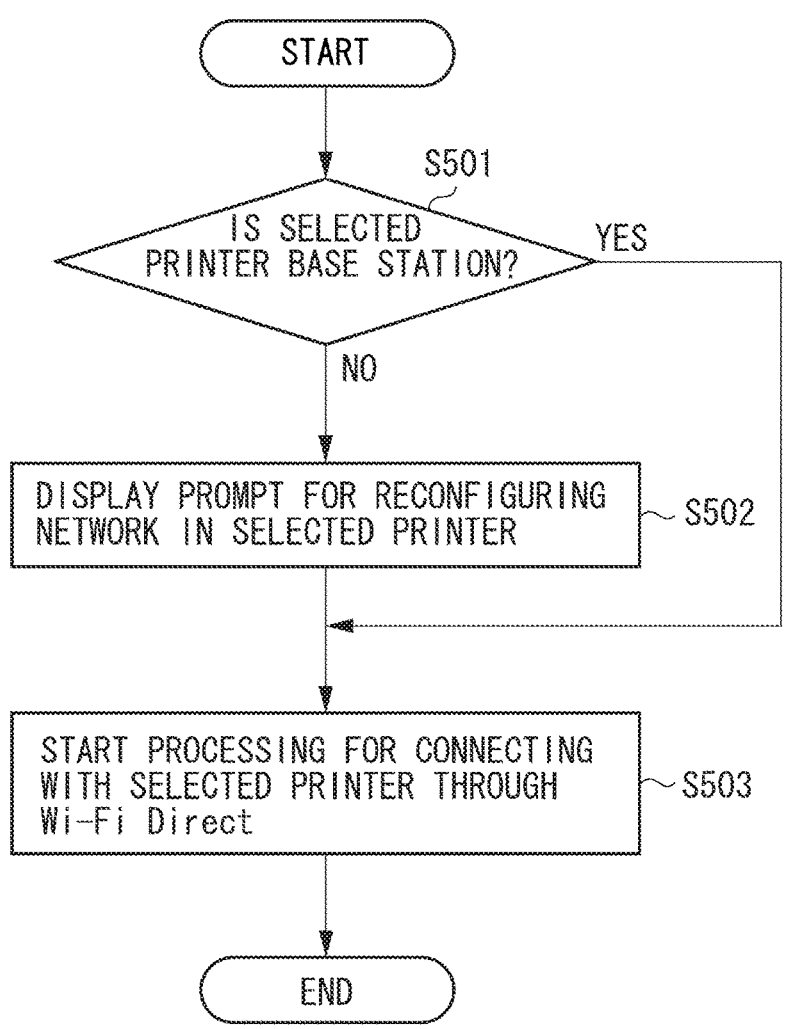
FIG. 5 is a flowchart illustrating a processing operation when selecting a printer according to the exemplary embodiment.

FIG. 5 is a flowchart illustrating printer connection processing, which is carried out by the camera 303. Each of the steps in the flowchart illustrated in FIG. 5 is implemented by the control unit 102 executing a program stored in the storage unit 103 of the camera 303.

Prior to the start of the processing in the flowchart illustrated in FIG. 5, the user specifies, from among the printers displayed in step S405 of FIG. 4, a printer to connect to by using the input unit 106.

Upon a printer to connect to being specified by the user, the processing in the flowchart illustrated in FIG. 5 starts. Although a case in which a printer has been selected as the type of the communication apparatus to search for is described in the example illustrated in FIG. 5 in conjunction with the description on FIG. 4, the processing can be carried out similarly, even when another type of communication apparatus is selected as a communication apparatus to search for.

In step S501, the connection processing unit 206 refers to the storage unit 103 and determines whether the printer specified by the user is a printer that is operating as a base station.

Figure 9:
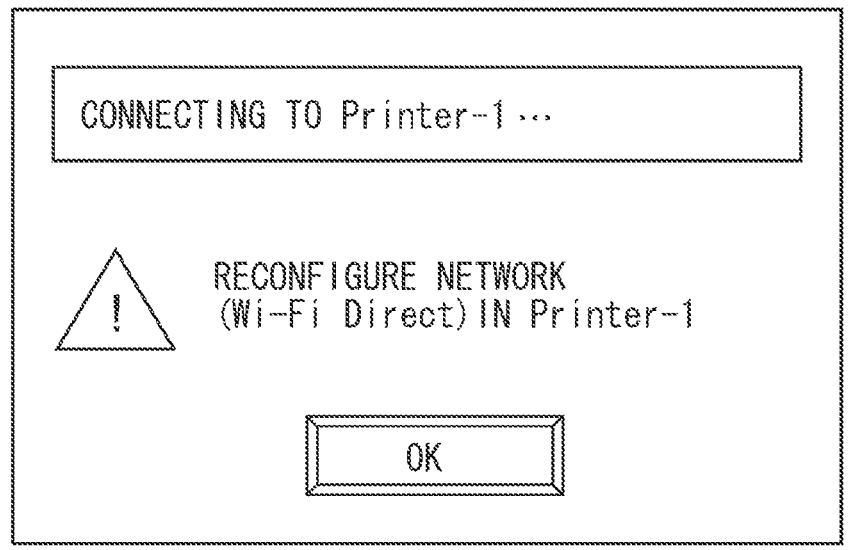
FIG. 9 illustrates another exemplary screen displayed on the camera according to the exemplary embodiment.

If the result of the determination indicates that the printer is not operating as a base station, or in other words, if the printer is operating as a wireless LAN client, then in step S502, the UI control unit 204 provides a display, on the display unit 105, to the effect that the network needs to be reconfigured for the selected printer. FIG. 9 illustrates an example of a screen displayed on the display unit 105 of the camera 303 in step S502.

After the screen is displayed in step S502, in response to the user operation for reconfiguring the network for the printer, in step S503, the connection processing unit 206 carries out processing for connecting to the selected printer as defined in Wi-Fi Direct.

Meanwhile, if the result of the determination in step S501 indicates that the printer is operating as a base station, in step S503, the connection processing unit 206 carries out processing for connecting to the selected printer as defined in Wi-Fi Direct without the UI control unit 204 displaying the screen illustrated in FIG. 9.

In the exemplary embodiment, in step S502, the UI control unit 204 displays such content as illustrated in FIG. 9 to prompt the user to reconfigure the network for the selected printer. In response to this prompt, the user reconfigures the network in the printer that is operating as a wireless LAN client, and thus the camera 303 can connect to the printer as defined in Wi-Fi Direct, which in turn allows the camera 303 and the printer to be directly interconnected.

Figure 6:
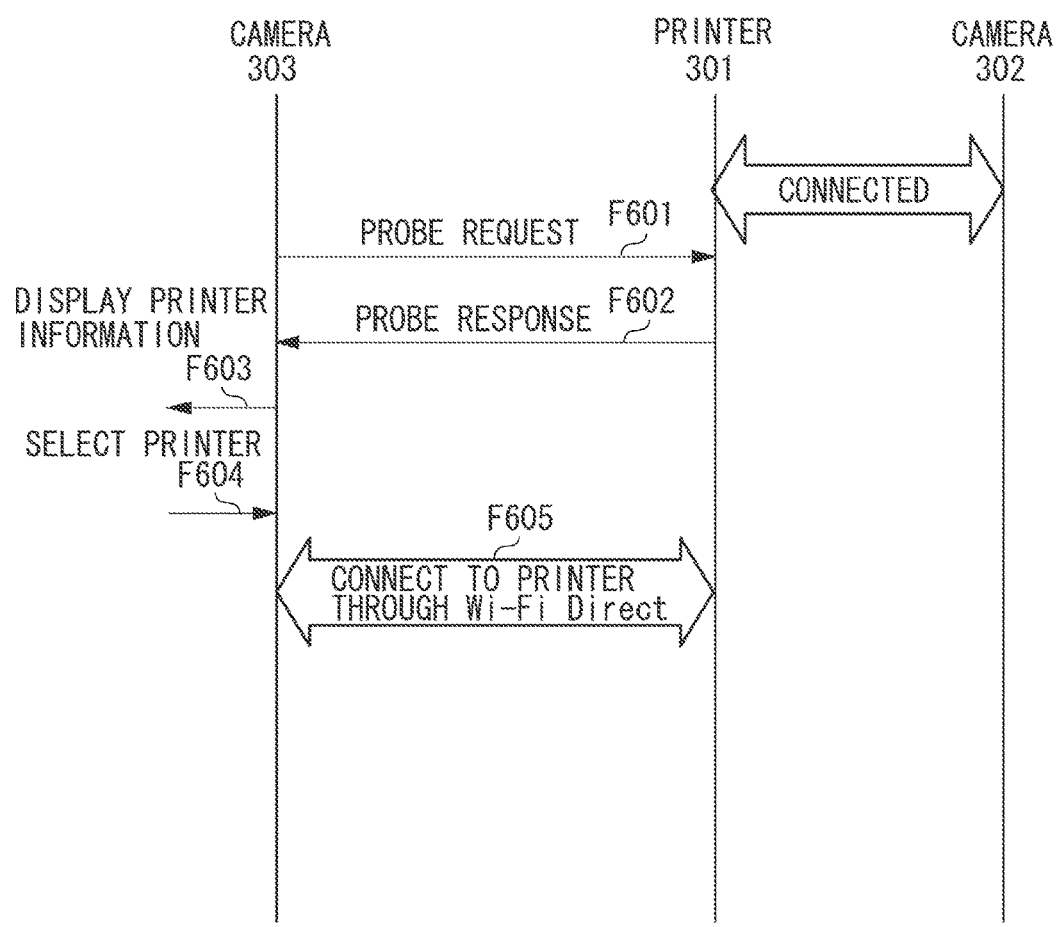
FIG. 6 is a first operation sequence diagram of a network system according to the exemplary embodiment.

FIG. 6 is a sequence diagram illustrating processing that is carried out when the camera 303 connects to the printer 301 that is operating as the base station in the network 304.

In step F601, the camera 303 starts the printer search processing, which has been described with reference to FIG. 4, and transmits a Probe Request.

In step F602, the printer 301, which is operating as the base station, transmits a Probe Response to the camera 303 in response to receiving the Probe Request. Here, "printer" is set in the apparatus type information and "camera" is set in the connected apparatus information in the transmitted Probe Response.

In step F603, the camera 303 detects the presence of the printer 301 serving as the base station from the received Probe Response and displays the information on the printer 301 on the display unit 105.

In step F604, the user specifies the printer 301 displayed on the display unit 105, and in step F605, the camera 303 carries out the printer connection processing, which has been described with reference to FIG. 5. Thus, the camera 303 connects to the printer 301 as defined in Wi-Fi Direct.

Figure 7:
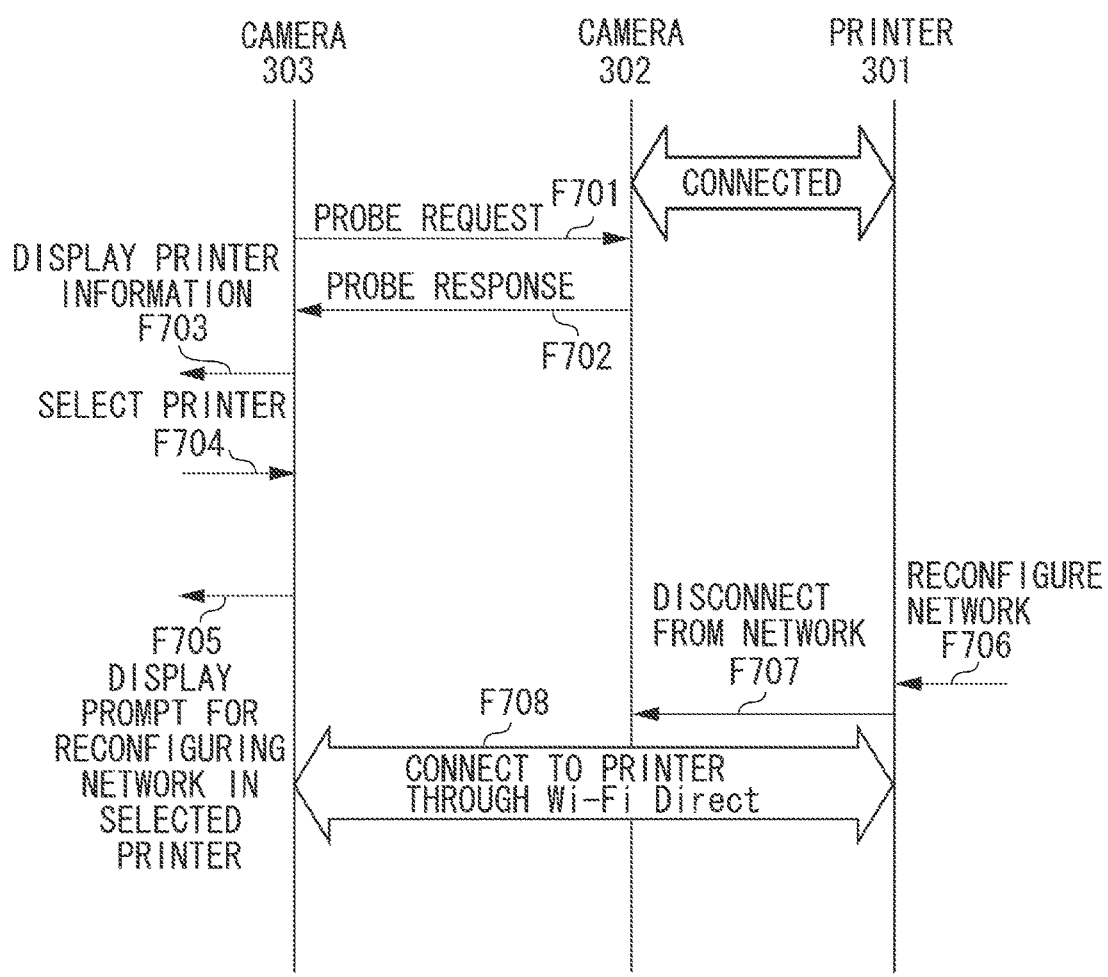
FIG. 7 is a second operation sequence diagram of the network system according to the exemplary embodiment.

FIG. 7 is a sequence diagram illustrating processing that is carried out when the camera 303 connects to the printer 301 that is operating as a wireless LAN client in the network 304.

In step F701, the camera 303 starts the printer search processing, which has been described with reference to FIG. 4, and transmits a Probe Request.

In step F702, the camera 302, which is operating as the base station, transmits a Probe Response to the camera 303 in response to receiving the Probe Request. Here, "camera" is set in the apparatus type information and "printer" is set in the connected apparatus information in the transmitted Probe Response.

In step F703, the camera 303 detects the presence of the printer 301 serving as the wireless LAN client from the received Probe Response and displays the information on the printer 301 on the display unit 105.

In step F704, the user specifies the printer 301 displayed on the display unit 105, and in step F705, the camera 303 provides a display to the effect that the network needs to be reconfigured for the printer 301.

In step F706, the user performs an operate, in accordance with the display on the camera 303, to reconfigure the network for the printer 301. Then, in step F707, the printer 301 disconnects from the connected network 304, and in step F708, the printer 301 starts the connection processing as defined in Wi-Fi Direct.

Thus, in step F708, the camera 303 connects to the printer 301 as defined in Wi-Fi Direct, and the camera 303 and the printer 301 become directly interconnected.

As described thus far, carrying out the processing described with reference to FIGS. 4 and 5 allows the camera 303 to present, to the user, only a candidate apparatus of a type desired by the user (e.g., a printer) to connect to from among the Wi-Fi Direct supported apparatuses that are present around the camera 303. In addition, the camera 303 can reliably present, to the user, a desired type of apparatus as a candidate to connect to even when that apparatus is operating as a wireless LAN client. Furthermore, the camera 303 can carry out an appropriate connection processing operation in accordance with whether the selected printer 301 is a base station. Thus, the user-friendliness further improves.

In the processing described with reference to FIG. 7, the camera 303 may refer to bridge availability information included in a Probe Response upon receiving a Probe Response from the camera 302.

The bridge availability information indicates whether the camera 302 that is operating as the base station is provided with a function of transferring data received from a connected wireless LAN client to another connected wireless LAN client.

The camera 303 may refer to the bridge availability information, and if the camera 302 is capable of bridging (i.e., capable of transferring data), the camera 303 may connect to the camera 302 as defined in Wi-Fi Direct upon the user selecting the printer 301.

In this case, the camera 303 can communicate with the printer 301 via the camera 302 upon connecting to the camera 302, which is operating as the base station. Thus, the camera 303 can communicate with the printer 301 through a similar user operation regardless of whether the printer 301 is operating as the base station, which improves the user-friendliness. In other words, the user operation for reconfiguring the network as indicated in step F706 of FIG. 7 becomes unnecessary.

In the processing described with reference to FIG. 7, the camera 303 may carry out invitation processing, which is defined in Wi-Fi Direct, upon the user selecting the printer 301.

In the invitation processing, the camera 303 can request the printer 301 to operate as a base station and can participate in a wireless network established by the printer 301, which is started as the base station, to thus connect to the printer 301. Alternatively, in the invitation processing, the camera 303 can start itself as a base station and can request the printer 301 to participate in a wireless network established by the camera 303 to thus connect to the printer 301.

Through the invitation processing described above, the printer 301 can either operate as a base station and accept a connection from the camera 303 or operate as a wireless LAN client and connect to the camera 303 operating as the base station.

Thus, the camera 303 can communicate with the printer 301 through a similar user operation regardless of whether the printer 301 is operating as the base station, which further improves the user-friendliness.

The exemplary embodiment described above is merely an example for implementing the present invention, and various modifications can be made without departing from the spirit of the present invention. The printer 301 and the camera 302 of the exemplary embodiment described above are examples of a first communication apparatus and a second communication apparatus in the present invention.

The communication apparatus of the exemplary embodiment described above is not limited to a digital camera or a printer. The communication apparatus may be a PC, a tablet terminal, or a mobile terminal such as a portable telephone and a smartphone. Furthermore, the communication apparatus may be an image processing apparatus such as a copying machine, a scanner, a facsimile apparatus, and a multifunction peripheral or a digital consumer electrical appliance such as a television and a recorder.

The network on which the communication apparatus is present can be applied to an ad hoc mode or infrastructure mode wireless network.

The type of the apparatus specified by the user prior to the start of the processing in the flowchart illustrated in FIG. 4 in the exemplary embodiment is an example of a condition for selecting a communication apparatus to connect to and may be information other than the type of the communication apparatus. In other words, as a condition for selecting a communication apparatus to connect to, the use may specify, aside from the type of the communication apparatus, the capability of the communication apparatus, a function included in the communication apparatus, the name of the manufacturer of the communication apparatus, the state of the communication apparatus, or any other information.

The exemplary embodiment has been described above with an IEEE 802.11 compliant wireless LAN serving as an example and, in particular, with a system compliant with Wi-Fi Direct serving as an example. The present invention, however, may be implemented in another wireless communication such as wireless Universal Serial Bus (USB), Multi Band Orthogonal Frequency Division Multiplexing (OFDM) Alliance (MBOA), Bluetooth (registered trademark), ultra wide band (UWB), and ZigBee (registered trademark). The present invention may also be implemented in a wired communication medium such as a wired LAN. The UWB includes Wireless USB, Wireless 1394, and WiNET.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus configured to perform wireless communication, comprising:
   at least one processor; and
   at least one memory storing code to be executed by the at least one processor, wherein the at least one processor executes the code to function as:
   a search unit configured to search for another communication apparatus by transmitting a probe request and receiving a probe response in return;
   a display unit configured to display information about other communication apparatuses found as a result of search by the search unit, wherein the information includes information for identifying whether each of the other communication apparatuses is operating as a base station;
   an acceptance unit configured to accept designation of the other communication apparatus for the communication apparatus to connect to from among the other communication apparatuses displayed by the display unit; and
   a connection unit configured to connect to, in a case where the designated other communication apparatus is not operating as a base station, the other communication apparatus in response to a particular operation being performed by a user on the other communication apparatus, and connect to, in a case where the designated other communication apparatus is operating as a base station, the other communication apparatus even when the particular operation is not performed by the user on the other communication apparatus.

2. The communication apparatus according to claim 1, wherein the particular operation is an operation for reconfiguring a network for the designated other communication apparatus.

3. The communication apparatus according to claim 2, wherein the designated other communication apparatus disconnects from a currently connected network in response to the particular operation.

4. The communication apparatus according to claim 1, wherein the other communication apparatus is a printer.

5. The communication apparatus according to claim 1, wherein the connection unit executes connection processing defined in Wi-Fi Direct.

6. The communication apparatus according to claim 1, wherein the communication apparatus performs wireless communication compliant to IEEE802.11.

7. The communication apparatus according to claim 1, wherein
   the display unit displays, in a case where the designated other communication apparatus is not operating as the base station, a prompt that prompts the user to perform the particular operation for the other communication apparatus.

8. The communication apparatus according to claim 1, wherein the other communication apparatus not operating as the base station is operating as a client apparatus.

9. A method for controlling a communication apparatus configured to perform wireless communication, the method comprising:
   searching for another communication apparatus by transmitting a probe request and receiving a probe response in return;
   displaying information about other communication apparatuses found as a result of search by the searching, wherein the information includes information for identifying whether each of the other communication apparatuses is operating as a base station;
   accepting designation of the other communication apparatus for the communication apparatus to connect to from among the other communication apparatuses displayed by the displaying; and
   connecting to, in a case where the designated other communication apparatus is not operating as a base station, the other communication apparatus in response to a particular operation being performed by a user on the other communication apparatus, and connecting to, in a case where the designated other communication apparatus is operating as a base station, the other communication apparatus even when the particular operation is not performed by the user on the other communication apparatus.

10. A non-transitory computer readable storage medium storing instructions that, when executed, cause a computer to perform a process, the process comprising:
- searching for another communication apparatus by transmitting a probe request and receiving a probe response in return;
- displaying information about other communication apparatuses found as a result of search by the searching, wherein the information includes information for identifying whether each of the other communication apparatuses is operating as a base station;
- accepting designation of the other communication apparatus for the communication apparatus to connect to from among the other communication apparatuses displayed by the displaying; and
- connecting to, in a case where the designated other communication apparatus is not operating as a base station, the other communication apparatus in response to a particular operation being performed by a user on the other communication apparatus, and connecting to, in a case where the designated other communication apparatus is operating as a base station, the other communication apparatus even when the particular operation is not performed by the user on the other communication apparatus.

* * * * *